May 8, 1923.
C. H. MERRITT
1,454,130
MEASURING INSTRUMENT
Filed Feb. 27, 1922
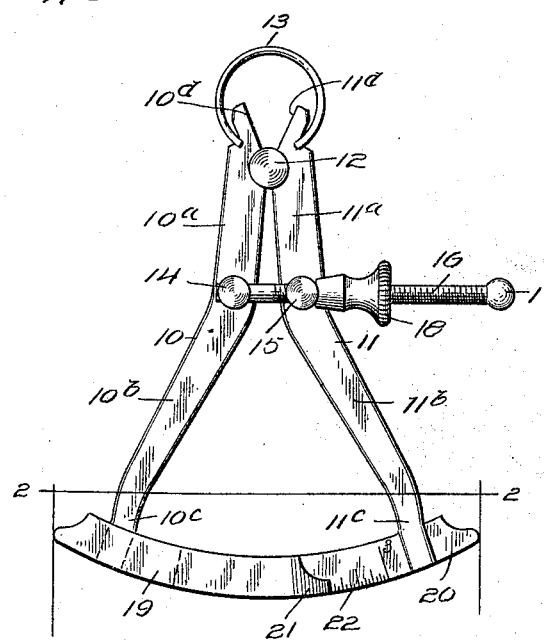
C. H. Merritt, INVENTOR.
BY Geo. F. Kimmel, ATTORNEY.

Patented May 8, 1923.

1,454,130

UNITED STATES PATENT OFFICE.

CLARENCE H. MERRITT, OF HEPPNER, OREGON.

MEASURING INSTRUMENT.

Application filed February 27, 1922. Serial No. 539,521.

*To all whom it may concern:*

Be it known that I, CLARENCE H. MERRITT, a citizen of the United States, residing at Heppner, in the county of Morrow and State of Oregon, have invented certain new and useful Improvements in Measuring Instruments, of which the following is a specification.

This invention relates to certain improvements in measuring instruments generally, and more particularly to a calliper type of the same adapted for the accurate measurement of the interior dimensions or diameters of any and all classes of hollow articles, bodies, elements or parts.

The principal object of the invention is to provide for a measuring instrument of the class described, and one of an extremely simple construction and arrangement of parts, and designed for the accurate measurement of the interior diameters of piston rings, especially during the cutting or filing operations of the same, whereby to assure of the snug tight fit of the rings within the piston ring grooves provided for their reception on the pistons of engines or the like.

With this and other objects in view, the invention resides in the certain new and useful construction and arrangement of parts as will be hereinafter more fully described, set forth in the appended claims, and illustrated in the accompanying drawing, in which:—

Figure 1 is a front elevation of a preferred embodiment of the instrument, and,

Fig. 2 is a horizontal section taken on the line 2—2 of Fig. 1.

Referring to the drawing, the preferred embodiment of the invention comprises a pair of leg sections 10 and 11, consisting of straight upper portions $10^a$, $11^a$, intermediate lower portions $10^b$, $11^b$, angularly bent outwardly in opposite directions from the upper portions $10^a$, $11^a$, and lower end portions $10^c$, $11^c$, angularly bent inwardly with respect to the lower ends of the intermediate end portions $10^b$, $11^b$, substantially as shown. The leg sections are hinged or pivoted together as at 12, and at a joint slightly inward from the upper end portions of the straight portions $10^a$, $11^a$, thereof, and the opposed edges of the upper ends of the portions $10^a$, $11^a$, are operatively and outwardly bevelled as at $10^d$, $11^d$, whereby to admit of a relatively wide range of hinging or pivoting movement of the leg sections 10, and 11 one with respect to the other, while the outer edges of these end portions are similarly recessed to receive therein the opposite ends of a semi-circular spring element or member 13. Formed with or otherwise secured to the leg sections 10 and 11, at points on the straight upper portions $10^a$, $11^a$, immediately adjacent the point of connection of the latter with the intermediate portions $10^b$, $11^b$, are a pair of studs or pins 14 and 15, in the stud or pin 14 of which is secured one end of an adjustment rod or bar 16 extending through and in threaded engagement with the other stud or pin 15, the threaded portion of the rod or bar 16 extending from a point immediately adjacent its end secured in the stud or pin 14 and throughout the remaining length thereof between such point and the spherical portion 17 formed at the free end of the same. Threaded on the rod 16 between the stud or lug 15 and the spherical end portion 17 thereof is an adjusting member or nut 18, which has its inner end arranged in abutting relation to the stud or lug 15, so that, when the member or nut 18 is manipulated inwardly on the rod 16, the leg sections 10 and 11 are forced toward each other against the opposed tension of the spring member 13, while, in the reversed operation of the member or nut 18, the spring 13 acts to force the leg sections apart, tensioning the same at all times, whereby the stud or pin 15 is maintained in substantial abutting relation or contact with the inner opposed end of the member or nut 18 throughout the entire range of adjustment of the leg sections one with respect to the other.

Affixed to the angularly disposed lower end portions $10^c$, $11^c$, of the leg sections 10, 11, are a pair of measuring arms or blades 19 and 20, which are curved one correspondingly with the other and on lines defined by the arc of a circle having as its center the center of a pivot or hinge connection 12. The arms or blades 19 and 20 are secured on opposite sides of the leg portions $10^c$, $11^c$, so as to extend one in a plane parallel to the other and with their inner ends disposed in overlapping relation, while the outer of their ends are projected at equal distances beyond the outer opposite edges of the leg portions $10^c$ and $11^c$, and these latter ends are preferably cut away at their upper corners whereby the lower corner portions thereof are reduced to a relatively small area and consequently effect a more accurate contacting relation with respect to the inner surfaces of the articles, bodies, or parts whose inner diameters are to be measured. The inner end of the arm or blade 19 is also cut away at its upper corner, and in a manner to provide a reduced lower corner portion 21, which is preferably curved inwardly toward and nearly in contact with the outer face of the portion of the arm 20 overlapped by the inner end portion of the arm 19 and is cooperative with a suitable scale of graduations formed along the lower edge of the arm 20 for the purpose of giving a direct reading in inches and fractions thereof, as is desired in the accurate measuring of piston rings and the like, whereby to assure the required perfect fit of the same within the annular grooves formed on engine pistons and the like for their reception.

In the use of the instrument, and more especially in the measuring of the interior diameters of piston rings the indicating end 21 of the arm or blade 19 is set on the scale 22 of the arm or blade 20 to the required diameter of a finished piston ring (not shown) by the proper manipulation of the adjusting sleeve or nut 18 on the threaded rod or bar 16 to effect the necessary spreading or drawing together of the leg sections 10 and 11 for such purpose, and with the instrument thus adjusted, the arms or blades 19 and 20 are applied to the bore or opening of a piston ring until the opposite outer reduced ends will engage or closely contact the inner peripheral wall thereof at points diametrically of the same, when the piston ring will be ready to be sprung into a selected groove of an engine piston or the like.

From the foregoing, it will be readily apparent that, while a preferred embodiment of the instrument has been described and illustrated herein in specific terms and details of construction and arrangement of parts, various changes in and modifications of the same may be resorted to without departing from the spirit of the invention, or the scope of the claims appended hereto.

Having thus fully described the invention, what is claimed, is:—

1. In a measuring instrument as characterized, a pair of leg sections one pivoted to the other adjacent their upper ends, arms extending between said leg sections below the pivotal point thereof and overlapping one another at their inner ends and projecting from said legs at their outer ends, one of said arms having a graduated scale thereon and cooperative with the adjacent end of the other of said arms, and means for adjusting said leg sections.

2. In a measuring instrument as characterized, a pair of leg sections one pivoted to the other adjacent their upper ends, curved arms extending between said leg sections at the lower ends thereof and overlapping each other at their inner ends and projecting from said legs at their outer ends, one of said arms having a graduated scale thereon cooperative with the adjacent end of the other thereof, and means for adjusting said leg sections.

3. In a measuring instrument as characterized, a pair of leg sections one pivoted to the other adjacent their upper ends, arms extending between and secured to said leg sections at the lower ends thereof and overlapping each other at their inner end portions and projecting from said legs at their outer ends, one of said arms having a graduated scale thereon cooperative with the adjacent end of the other arm thereof, said arms being curved on an arc defined by a circle having as its center the center of the pivotal point of said leg sections, and means for adjusting said leg sections.

4. In combination, a calliper comprising a pair of identical leg sections pivoted together adjacent their upper ends, means for tensioning said leg sections, means for adjusting said leg sections, and arms carried at their lower ends of said leg sections, and having the major portions disposed in parallel overlapping relation one with respect to the other, the minor portions of said arms being projected at relatively slight distances outwardly of the outer edges of said leg sections, one of said arms having a graduated scale thereon cooperative with the adjacent end of the other of said arms, whereby a direct reading in inches and fractions thereof may be obtained in each adjustment of said adjusted means.

In testimony whereof I affix my signature hereto.

CLARENCE H. MERRITT.